United States Patent [19]
Wills

[11] Patent Number: 5,839,304
[45] Date of Patent: Nov. 24, 1998

[54] LOCKING DEVICE FOR A PARKING BRAKE

[76] Inventor: William H. Wills, 15710 SW. 40th Ter., Ocala, Fla. 34473

[21] Appl. No.: 936,311

[22] Filed: Sep. 24, 1997

Related U.S. Application Data

[63] Continuation-in-part of Ser. No. 585,906, Jan. 16, 1996, abandoned.

[51] Int. Cl.$^6$ ................................................ F16K 35/00
[52] U.S. Cl. ................................ 70/175; 70/179; 70/283; 74/483 PB; 180/287; 251/95; 303/6.1
[58] Field of Search ............................. 70/175–180, 279, 70/282, 283; 303/6.1, 19; 180/273, 287; 292/DIG. 37; 251/95; 74/483 PB

[56] References Cited

U.S. PATENT DOCUMENTS

| | | | |
|---|---|---|---|
| 1,675,465 | 7/1928 | Roehrich | 180/273 X |
| 3,000,459 | 9/1961 | Silver et al. | 180/273 |
| 3,508,625 | 4/1970 | Hawkins | 70/181 |
| 3,998,495 | 12/1976 | Maxwell et al. | 180/287 X |
| 4,102,164 | 7/1978 | Barbush | 70/283 X |
| 4,166,513 | 9/1979 | Johnson | 303/6.1 X |
| 4,465,311 | 8/1984 | Austin | 70/279 X |
| 4,494,805 | 1/1985 | Washburn | 70/279 X |
| 4,626,008 | 12/1986 | Yadrick | 292/DIG. 37 X |
| 4,779,433 | 10/1988 | Légaré | 70/177 X |
| 5,085,061 | 2/1992 | Maudsley | 70/279 X |
| 5,560,233 | 10/1996 | Watkins | 70/180 X |

FOREIGN PATENT DOCUMENTS

| | | | |
|---|---|---|---|
| 380111 | 9/1923 | Germany | 70/279 |

OTHER PUBLICATIONS

"Product News", p. 22, Sep., 1996 issue of STN (School Transportation News).

*Primary Examiner*—Lloyd A. Gall
*Attorney, Agent, or Firm*—David Kiewit

[57] ABSTRACT

A locking device for a parking brake on a bus having air brakes prevents accidental release of the parking brake when a sensing switch indicates that the bus should not move (e.g., when the driver is absent from the driver's seat, or a passenger-access door is open). The locking device of the invention is affixed to a portion of the bus adjacent a parking brake air valve that has an air valve shaft moving along its axis between a fully extended position, in which the valve is in a brake-applied status, and a frilly retracted position in which the valve is in a brake-released status. The locking device has a locking arm moving between a locked position in which it prohibits the parking brake valve shaft from moving into the fully retracted position and an unlocked position in which it does not affect the motion of the valve shaft. Conventionally, the valve shaft has a knob on the end distal from the valve body, and the locking arm in the locked position, prevents the knob from being pushed in all the way. Because this arrangement does not require opening the brake lines, but instead merely limits the motion of an existing moving part, the locking device does not become part of the manufacturer's brake system, nor does it affect that system's certification to meet applicable motor vehicle safety standards.

11 Claims, 4 Drawing Sheets

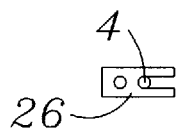
FIG. 3
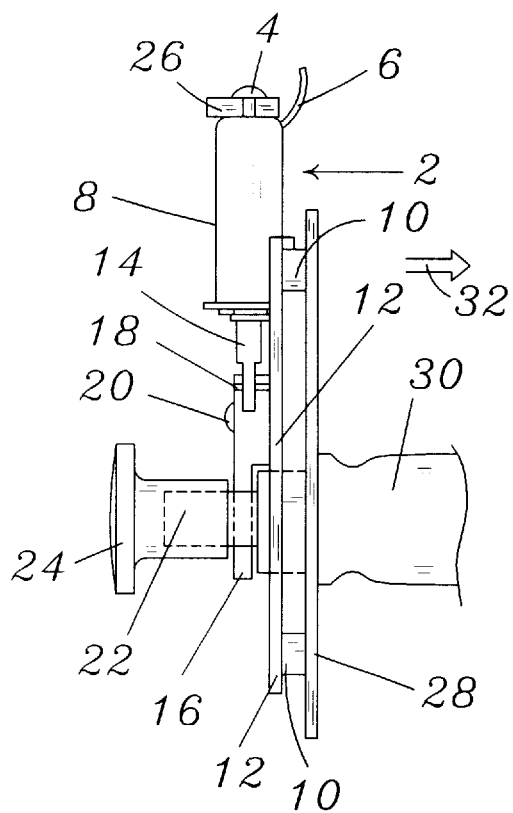
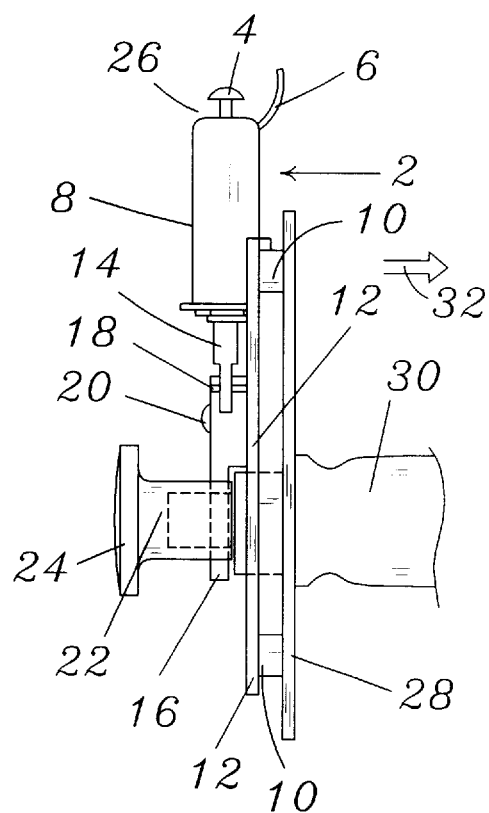
FIG. 4
FIG. 5

LOCKING DEVICE FOR A PARKING BRAKE

CROSS REFERENCE TO RELATED APPLICATIONS

This application is a continuation-in-part of U.S. Ser. No. 08/585,906, filed Jan. 16, 1996, which is to be abandoned on the filing of this application.

STATEMENT REGARDING FEDERALLY SPONSORED RESEARCH OR DEVELOPMENT

Not Applicable

BACKGROUND OF THE INVENTION

1. Field of the Invention

This invention relates to locking devices that automatically engage to prevent a parking brake of a vehicle from being accidentally released. Applications may include, but are not limited to, parking brakes on school buses.

2. Description of Prior Art

Any motorized vehicle which moves from rest unexpectedly may cause injuries. A school bus is no exception, especially during the time that children are getting on or off the bus and when they walk in front of the school bus after disembarking from it to cross a street. It is conventional practice (and in many states is required by law) that the parking brake on a school bus be engaged whenever children are entering or leaving the bus. There is thus a concern that accidental release of the parking brake could cause the school bus to move unexpectedly and result in injury. Moreover, the great majority of school buses are equipped with spring-applied, pneumatically-released brakes (hereinafter "air brakes") and have a hand-operated parking brake valve disposed adjacent to the dashboard or control panel. The valve customarily has an actuator comprising a valve shaft with a knob or handle on the end of it and is actuated into the brake-applied position when the vehicle operator pulls the knob outward from the dashboard (i.e., rearwardly of the body of the vehicle) and is actuated into the brake-released position when the operator pushes the knob forwardly far enough that the valve shaft attains a fully retracted position.

When the school bus driver is properly seated in the driver's seat of the school bus, he or she is positioned to control the braking system of the bus should the parking brake become accidentally released. However, when the school bus driver leaves the driver's seat unoccupied, he or she may not be in a position to quickly react to an accidental release of the parking brake. One reason that the driver might leave driver's seat is to help a person in a wheelchair gain access to the bus. Therefore, it would be desirable to have a device to automatically lock the parking brake of a bus into an engaged state whenever the driver of the bus leaves the driver's seat, or whenever any door (especially including a rearwardly positioned handicapped door, if the bus is so equipped) is open.

It is known to have a variety of valve assemblies for use in air brake systems. For example, the valve assembly disclosed in U.S. Pat. No. 5,322,353 to Wallestad (1994) controls the flow of air in a tractor-trailer brake system between a pressurized air supply in reservoir tanks and a spring-set air-release parking brake. Another example is the invention disclosed in U.S. Pat. No. 5,342,119 to Smith (1994) which has a valve that includes an electronic unit to control the air flow between a pressurized air supply and the brake system. Other valve assemblies provide electromagnetic control of air braking systems, selective or emergency venting of air brake systems to atmosphere, and control of braking forces. In addition, some valve assemblies insure that a spring brake will not be released until pressurization of a service reservoir is achieved. However, it is not known to have a locking device for the parking brake of a vehicle having air brakes, such as a bus, which has a solenoid, or other electromechanical actuator, wired to the driver's seat or to a passenger-access door of a vehicle so that when the driver's seat is vacated, or when any door is opened, the solenoid will automatically energize and move a locking member into a position in which the locking member prevents the vehicle's parking brake from being disengaged. Specifically, it is not known to have such a system preventing a parking brake control knob from being pushed fully toward the vehicle's dashboard and thereby releasing the air brakes.

It is known to provide an automatic locking mechanism that prevents a vehicle from being used and that is engaged when the driver leaves his seat or opens a vehicle door. Roehrich, in U.S. Pat. No. 1,675,465, teaches an arrangement employing sensing switches in the door and in the driver's seat of an automobile. When the driver arises from the seat or opens the door in a car equipped with Roehrich's apparatus, an electromechanical actuator disables the car from normal operation by either locking the transmission so that it can not be shifted, or de-coupling the steering wheel from the steering shaft. Although either of the approaches taught by Roehrich would prevent normal operation of the nominally protected vehicle, neither provides a means of preventing the vehicle from moving. It may be noted, for example, that driving a vehicle equipped with Roehrich's system on a bumpy road might cause loss of control when the driver is bounced out of his or her seat. Moreover, Roehrich does not teach means of keeping a vehicle in a disabled state during the persistence of a pre-determined operation after an operator has manually disabled the vehicle prior to initiating the predetermined condition.

Johnson, in U.S. Pat. No. 4,166,513, teaches an arrangement for automatically applying the parking brakes of a vehicle equipped with a push-pull parking brake actuator of the sort commonly employed on school buses. Johnson's system, like that of Roehrich's, appears to present a serious hazard in that it would apply the parking brake whenever the driver bounced out of his or her seat, or whenever the driver of a truck opened an ajar driver's-side door while in motion. Johnson's so-called safety brake apparatus engages the brake automatically but allows the operator to disengage the brake at any time. Johnson does not teach means of keeping a vehicle in a disabled state during the persistence of a pre-determined operation after an operator has manually disabled the vehicle prior to initiating the pre-determined operation.

It is also known to provide a locking mechanism for a vehicle that uses an electrically-driven bell crank to permit or to prohibit the axial translation of an elongated member. Barbush, in U.S. Pat. No. 4,102,164 teaches a theft prevention system in which a solenoid coupled to the ignition system is energized to release an axially translated latching member when the engine is turned off. Barbush's latching member moves under the influence of a bias spring to disable the ignition of the vehicle until a key operated switch is used to reset it. Barbush's arrangement does not provide means of controlling the brakes of a vehicle in order to prevent it from being moved. Barbush does not teach means of keeping a vehicle in a disabled state during the persistence of a pre-determined operation after an operator has manually disabled the vehicle prior to initiating the pre-determined operation.

SUMMARY OF THE INVENTION

It is an object of this invention to provide a locking device for a parking brake on a bus which will automatically lock an engaged parking brake in its engaged position whenever a safety switch indicates that the bus should not be moved. Safety switches used with the invention can be used to indicate that the driver of the bus has left his or her seat; that a passenger-access door on the bus (which may include a lift-equipped door for use by handicapped students), is open; or that the bus engine is being warmed up or the bus is being repaired.

More generally, it is an object of this invention to provide means of keeping a vehicle in a disabled state during the persistence of a pre-determined condition that occurs after an operator has manually disabled the vehicle. More specifically, it is an object of this invention to provide means of keeping a parking brake on a school bus applied as long as a passenger-access door is open, where the operator, in stopping to allow a passenger to enter or leave, halts the bus, applies the parking brake, and opens a door.

It is a further object of this invention to provide a locking device which is easy to install. In particular, it is an object to provide such an easily installed device for after-market installation by a bus mechanic or maintenance worker.

It is yet a further object of this invention is to provide a locking device which is easily overridden should it malfunction. It is a further specific object of this invention to provide an after-market locking device that can be installed without affecting the certification of the manufacturer's brake system, which, in the U.S., is conventionally required to meet federal motor vehicle safety standards.

As described herein, properly manufactured and installed in a bus, the present invention provides a locking device for a parking brake on a bus having air brakes, the device preventing accidental release of the parking brake when a sensing switch indicates that the bus should not move (e.g., the driver is absent from the driver's seat, or a door is open). The locking device of the invention is affixed to a portion of the bus adjacent a parking brake air valve that has an air valve shaft moving along its axis between a fully extended position, in which the valve is in a brake-applied status, and a fully retracted position in which the valve is in a brake-released status. The locking device has a locking arm moving between a locked position in which it prohibits the parking brake valve shaft from moving into the fully retracted position and an unlocked position in which it does not affect the motion of the valve shaft. Conventionally, the valve shaft has a parking brake knob on the end distal from the valve body, and the locking arm, when in the locked position, prevents the knob from being pushed forwardly of the bus body far enough toward the valve body to release the brakes. Because this arrangement does not require opening the brake lines, but instead merely limits the motion of an existing moving part thereof, the locking device of the present invention does not become part of the manufacturer's brake system, nor does it affect that system's certification to meet applicable motor vehicle safety standards.

The device of the invention is easy to install, requiring only the temporary removal of the parking brake knob and the positioning of several self-tapping screws through mounting holes on the support plate to which the solenoid and locking arm are mounted in order to attach the support plate to the bus's dashboard or console. A switch (or switches) associated with the driver's seat, or with the doors on a bus, is used to automatically energize a solenoid that moves a locking arm into the locked position when the driver leaves the driver's seat or when any door on the vehicle, including a handicapped door, is open.

DESCRIPTION OF THE DRAWING

FIG. 3 is a perspective view of a first embodiment of an override clip which can be used to operate the parking brake apparatus depicted in FIGS. 1 and 2 when the solenoid is not energized.

FIG. 4 is a side view of the first embodiment of the invention showing the clip in position adjacent to the stroke adjustment screw to prevent override.

FIG. 5 is a side view of the first embodiment of the invention in an unlocked position without the clip and with the parking brake knob pushed inward toward the air brake valve.

DETAILED DESCRIPTION OF PREFERRED EMBODIMENTS

Figure 6:
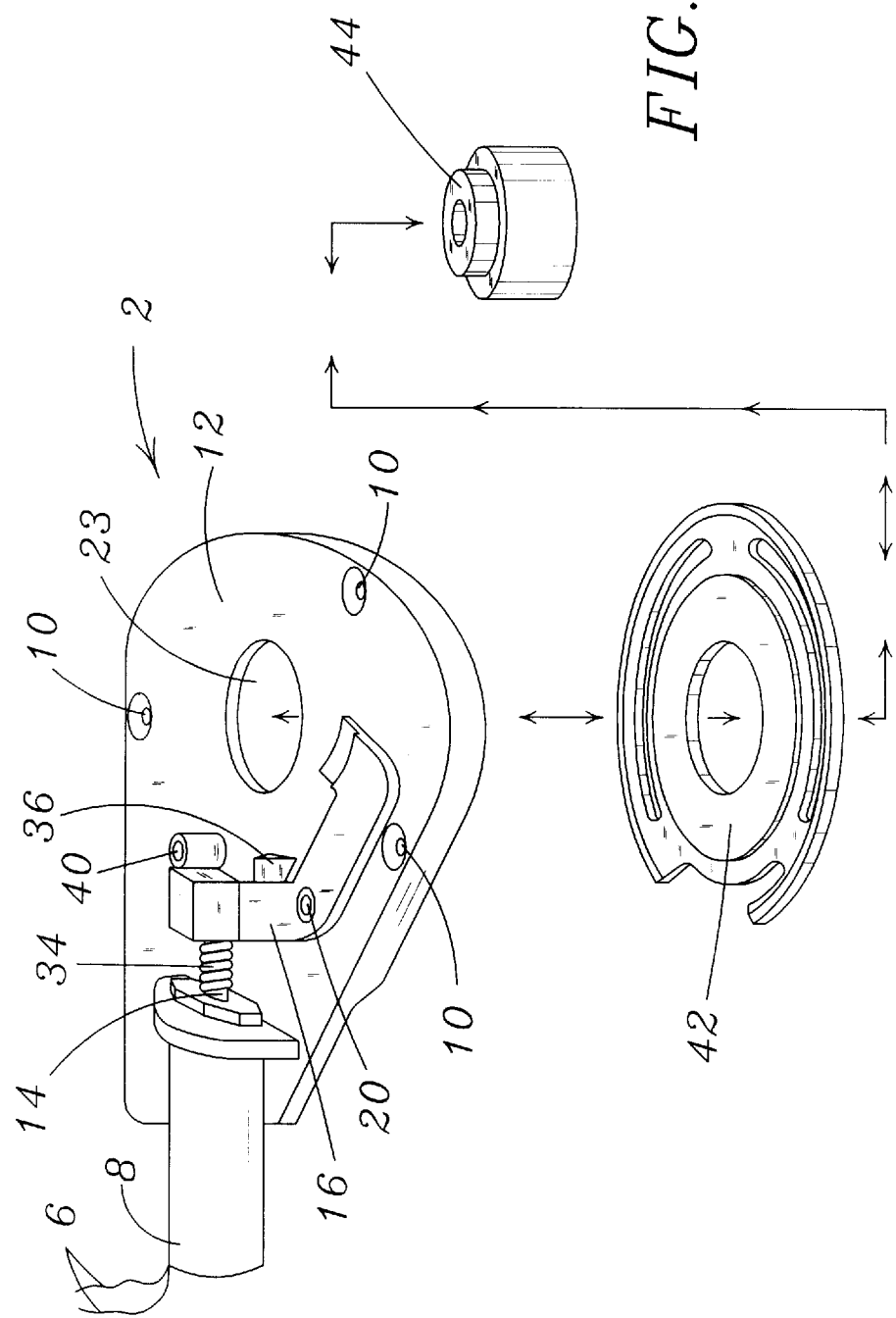
FIG. 6 is an exploded elevational view of a preferred embodiment of the invention.
Figure 7:
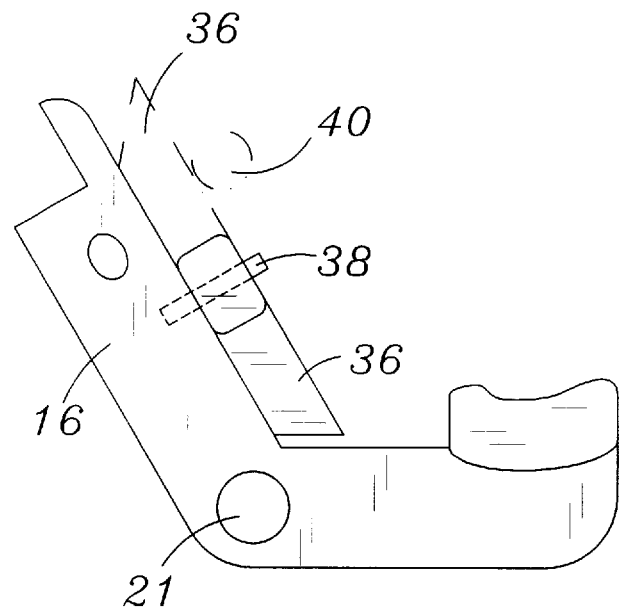
FIG. 7 is a detailed plan view of the bell-crank and locking bar used in the embodiment of FIG. 6.

A first embodiment of an air brake locking device 2 is depicted in FIGS. 1–5, and a preferred embodiment of the locking device 2 is depicted in FIGS. 6 and 7. The locking device 2 has a solenoid 8, the plunger 14 of which is connected to a bell-crank locking arm 16 by means of a pivotal connection 18. The bell-crank 16 is attached to a support plate 12 by a pivotal attachment means 20, which in the preferred embodiment is a stud formed integrally with the support plate 12, the end of the stud distal from the plate 12 being thermally deformed after it is inserted through a hole 21 in the bell-crank 16.

In the embodiment of FIGS. 1–5, the locking device is mounted so that the axis of solenoid 8 is vertical and the solenoid 8 is directly above a shaft 22 of a parking brake air valve 24, and so the shaft 22 protrudes through a through-hole 23 in the mounting plate 12. In this embodiment a stroke adjusting screw 4 is threaded into the upper end of the solenoid plunger 14 and limits the downward travel of the plunger 14 when the head of the screw 4 abuts the body of the solenoid 8.

Figure 1:
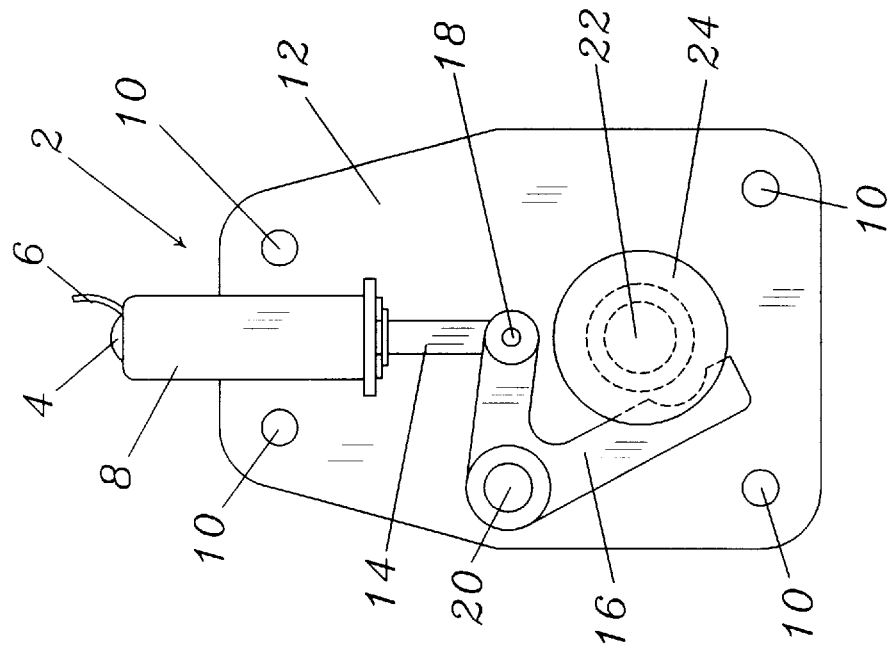
FIG. 1 is a front view of a first embodiment of the invention with the locking arm in a closed position so that the parking brake knob may not be pushed far enough forward of the bus body to allow the valve shaft to attain a fully retracted position.

FIG. 1 depicts a locked state of the apparatus 2 wherein the solenoid 8 is energized and the free end of the locking arm 16 is closely adjacent a parking brake valve shaft 22. In this position the arm 16 is between a parking brake valve knob 24 and the mounting plate 12, which is mounted onto the dashboard 28 of a bus. In this position the locking arm 16 acts to prevent the parking brake from being released when the parking brake knob 24 is pushed towards the front of the bus (the direction denoted in FIG. 5 by the hollow arrow 32) so as to push the valve shaft 22 into its fully retracted position. In this embodiment the clearance between the parking brake knob 24 and the locking arm 16 is preferably not less than ten nor more than twenty one-thousandths of an inch.

Figure 2:
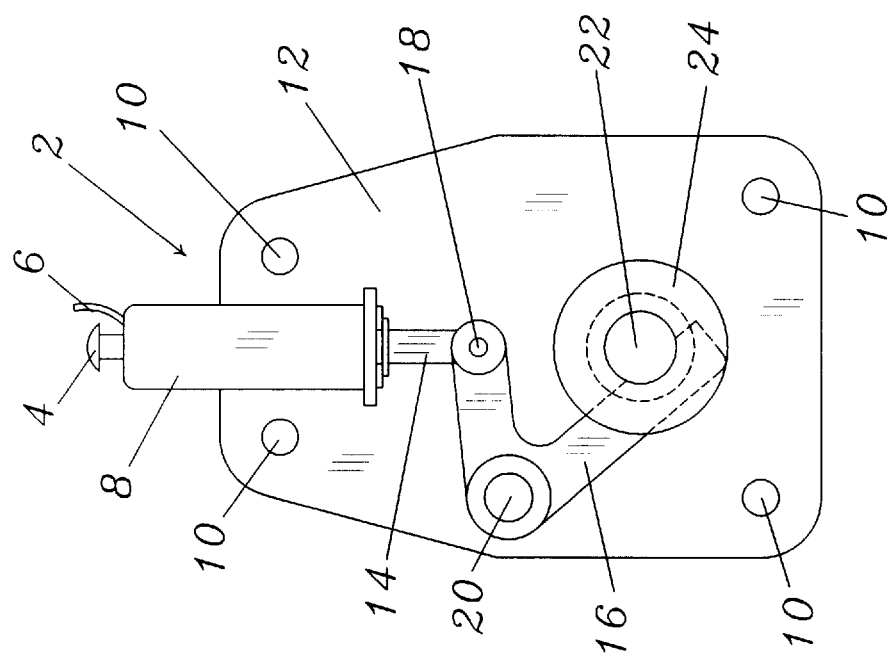
FIG. 2 is a front view of the first embodiment of the invention where the locking arm is in an open position so that the parking brake may be released

FIG. 2 depicts an unlocked position of the apparatus 2 wherein the solenoid is de-energized, the plunger has moved to its lowest position under the influence of gravity, and the free end of the locking arm 16 is pivoted away from the parking brake knob 24 so that the parking brake knob 24 is able to move forwardly with respect to the vehicle body and thereby disengage the air brakes (not shown). It may be noted that although the discussion supra refers to a "knob", it will be understood to those skilled in the art that a wide variety of objects such as collars, washers, and handles extending radially outward from the shaft 22 could be used so long as the protruding portion or member protruded far enough that a cooperating locking member 16 could be interposed between the protrusion and the valve body in order to prohibit the shaft 22 from attaining its retracted position. Specifically, an ell-shaped or tee-shaped handle could be used. Additionally, FIGS. 1 and 2 show a support plate 12 having four mounting holes 10 for use with self-tapping screws (not shown) to mount the air brake locking apparatus 2 to a bus dashboard, console, or other fixed support to which the parking brake air valve 24 is mounted turning now to FIG. 6, one finds a depiction of a preferred embodiment having a compressed coil spring 34 interposed between the pivotal connection 18 between the solenoid 8 and the locking arm 16. The provision of the spring 34 to urge the end of the bell-crank 16 away from the solenoid allows the apparatus 2 to be operated in any orientation, as the force of gravity is not relied on (as it was in the first embodiment) to disengage the locking arm 16 from the valve shaft and knob when the solenoid is de-energized.

The preferred embodiment of the invention also comprises a mounting insert 42 and a bushing 44 which allow a single shippable model of the apparatus 2 to be used with substantially all contemporary air brake valves. That is, various combinations of the insert 42 and bushing 44 may be mounted between the mounting plate 12 and the dashboard 28 of the vehicle to adapt the installation to a pre-installed parking brake air valve 24 having one of the two commonly encountered shaft diameters.

It is expected that there will be times when it is desirable to keep the parking brake of a bus engaged, and to prevent accidental release of the brakes (e.g., as might happen if someone accidentally bumped the knob 24) for an extended period without keeping the solenoid 8 energized (e.g., when the bus is parked for an extended period with the engine turned off). This goal may be served by the use of a manually movable member that may be moved into an override position in which the locking member is retained in its locked position regardless of whether the electromechanical is energized or de-energized. In the embodiment of the invention depicted in FIGS. 1–5, this override feature is provided by a second locking member, called a locking clip 26, that may be inserted between the head of the screw 4 and the end of the solenoid 8 (e.g., as depicted in FIG. 4) so as to hold the solenoid plunger 14 and bell crank 16 in the locking position in which the shaft of the parking brake valve is prohibited from reaching its fully retracted position. In the embodiment of FIGS. 6 and 7, the same feature is provided by means of a second locking member, or locking tab 36, that is pivotally attached (e.g., by a pin 38) to the locking arm 16 so that it can be pivoted between a normal, unlocked, position (depicted in solid lines in FIG. 7) and a locked position (depicted in single dot phantom in FIG. 7) wherein the locking tab 36 is interposed between the bell-crank 16 and a motion-limiting stud 40.

The material from which support plate 12 is made is not critical to air brake locking invention 2. In the preferred embodiment, the support plate 12 and locking arm 16 are molded from a fiberglass-reinforced nylon. Although the means of attaching the support plate 12 to the bus or other vehicle 46 adjacent the body of the parking brake air valve 30 is not critical, in the preferred embodiment three self-tapping screws (not shown) are inserted through mounting holes 10 in the support plate 12 and fastened into the dashboard 28 of a bus 46. Since the present invention acts as a physical restraint to prevent the parking brake knob 24 from moving forwardly toward the dashboard 28 of a bus or other vehicle, the present invention, when installed, does not use or become part of the manufacturer's brake system (not shown) that has already been certified to meet federal motor vehicle safety standards.

Figure 8:
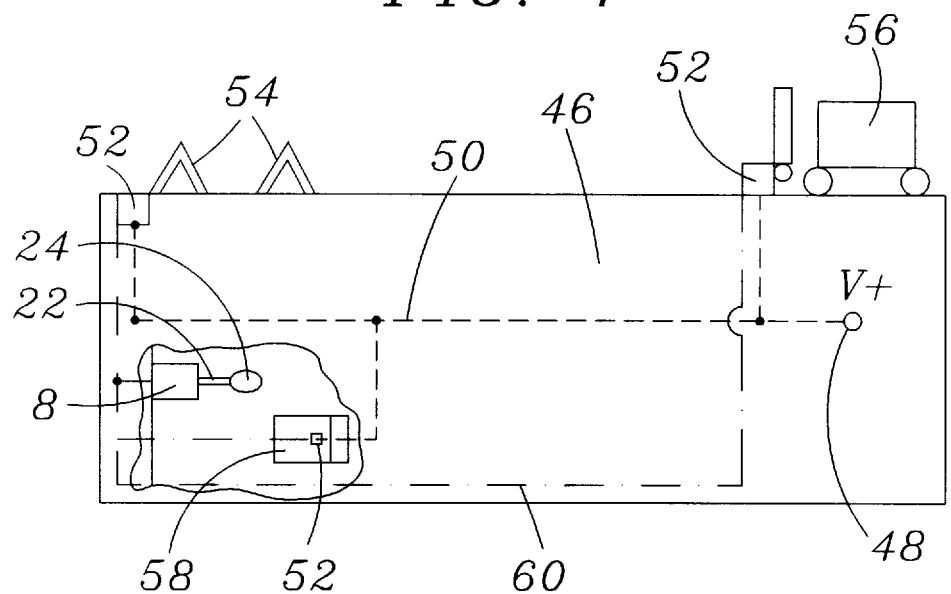
FIG. 8 is a partly cut-away schematic plan view of a bus having apparatus of the invention installed thereon.

Turning now to FIG. 8, one finds a schematic depiction of an application of the invention to a school bus 46 having a source of electric power 48 (e.g., a point on the chassis electric harness that is energized when the engine (not shown) is running, a point commonly called "hot in run") that is wired (e.g., as indicated by the dashed line 50) to one or more sensing switches 52 used in known ways to sense the persistence of a predetermined condition during which an applied parking brake should not be released. Such conditions may comprise an open passenger door 54 (it is a common requirement in the operation of a school bus that the parking brakes be engaged whenever students are entering or leaving the bus), a wheelchair lift 56 (accidents in which a school bus driver assists a wheelchair-bound student from the bus to his or her home, returns to the bus, and drives off without raising and stowing the lift are unfortunately common), or an empty driver's seat 58.

The sensing switches 52 are connected to an electromechanical actuator (which may be the preferred solenoid 8, but which could also be an electric motor) by wires 60 (depicted in FIG. 8 as dot-dash lines) so that as long as any of the predetermined conditions persists, the actuator is energized by the power source 48 and moves the locking member into a locked position adjacent the parking brake valve shaft wherein the locking member is interposed between the knob 24 and the body of the valve 30 so as to prohibit the valve shaft 22 from being moved into a brake-released position. It will be understood to those skilled in the art that although a simple parallel array of normally open switches can be used to sense the persistence of one of the predetermined conditions, many other arrangements are known in the sensing arts and include the use of various types of sensing switches 52 (e.g., normally closed switches as commonly used in intrusion alarm systems), moreover, one can use different sources of electrical power, and sense for different sorts of predetermined conditions on different types of vehicles (e.g., the invention could be used to prevent a driver from releasing the parking brakes of a truck while a hydraulically operated rear load gate was down). In the preferred embodiment, the electric actuator is a solenoid 8 operable from either a positive or a negative DC power supply, so that an installer can install the apparatus without concern as to polarity.

In the operation of the apparatus of the invention, it should be noted that the apparatus does not apply the parking brakes of a vehicle, but rather provides means of keeping those brakes engaged during the persistence of a condition for which the operator of the vehicle has applied the parking brakes. That is, if the solenoid 8 is energized when the parking brake is not applied, the locking arm impinges on the knob 24 and is thereby prevented from moving into the locking position—i.e., the locking arm can not move the shaft rearwardly of the chassis of the vehicle, but can only impose a limitation to the forward motion of that shaft. To see that this is a useful feature, consider a bus equipped with the invention so that the parking brake remains applied whenever the driver's seat is empty. If this bus is operated on a bumpy dirt road, the driver may occasionally be thrown upwards out of the seat, at which time the seat sensing switch would determine that the seat was momentarily empty and would energize the solenoid. This would not result in an undesirable and uncontrolled application of the parking brakes.

Although the present invention has been described with respect to several embodiments, many modifications and alterations can be made without departing from the invention. Accordingly, it is intended that all such modifications and alterations be considered as within the spirit and scope of the invention as defined in the attached claims.

It is claimed:

1. In a vehicle having a parking brake adapted to be manually engaged by an operator moving a shaft of a parking brake valve from a retracted position wherein the parking brake is disengaged to an extended position wherein the parking brake is engaged, the parking brake valve fixedly attached to a body of the vehicle, a protrusion extending radially outward from the shaft adjacent an end thereof distal from a body of the valve, an improvement for prohibiting the parking brake from being disengaged during the persistence of a predetermined condition, the improvement comprising:

means for attaching an electromechanical actuator and a locking member to the vehicle adjacent the parking brake valve;

a source of electric power for energizing the actuator; and a sensing switch for sensing the persistence of the predetermined condition;

wherein the electromechanical actuator is operably connected to the locking member so that, when energized, the actuator moves the locking member from an unlocked position wherein the locking member is not interposed between the protrusion and the body of the valve into a locked position wherein the locking member is interposed between the protrusion and the body of the valve, thereby prohibiting the shaft from attaining die retracted position.

2. The apparatus of claim 1 wherein the sensing switch is a normally closed switch that is closed whenever a passenger-access door of the vehicle is open.

3. The apparatus of claim 1 wherein the sensing switch is a normally open switch that is closed whenever a driver's seat is unoccupied.

4. The apparatus of claim 1 wherein the means for attaching the electromechanical actuator comprises a mounting plate, wherein the electromechanical actuator comprises a solenoid, and wherein the locking member comprises a bell-crank arm pivotally attached to the mounting plate.

5. The apparatus of claim 1 wherein the protrusion comprises a knob.

6. The apparatus of claim 1 further comprising a second locking member adapted to be manually moved into a second locking position wherein the second locking member cooperates with the first locking member to prevent the shaft from attaining the retracted position when the electromechanical actuator is not energized.

7. A method of keeping a parking brake on a vehicle in a brake-applied state during the persistence of a predetermined condition that begins subsequent to an operator of the vehicle placing the brake in the brake-applied state by pulling a knob attached to a parking brake shaft from an initial brake-released position rearwardly of a body of the vehicle, the method comprising the steps of:

(a) initiating, by means of an act by the operator, the predetermined condition;

(b) sensing, by means of a sensing switch, the predetermined condition;

(c) energizing, responsive to the sensing switch sensing the predetermined condition, an electromechanical actuator operatively connected to a locking member, whereby the locking member moves into a locked position adjacent the shaft, the locking member in the locked position cooperating with the knob to prohibit the shaft from moving into the brake-released position.

8. The method of claim 7 wherein the predetermined condition comprises a passenger-access door in an open state and wherein the sensing switch comprises a normally closed switch that is closed when the passenger access door opens.

9. The method of claim 7 wherein the actuator comprises a solenoid and wherein the locking member comprises a bell-crank arm operatively attached to the solenoid for pivotal motion with respect to a dashboard of the vehicle.

10. The method of claim 7 further comprising the steps, after step (c) of:

(d) terminating, by means of a second act of the operator, the predetermined condition;

(e) sensing, by means of the sensing switch, that the predetermined condition has terminated;

(f) de-energizing the electromechanical actuator responsive to the sensing switch sensing that the predetermined condition has terminated, whereby the locking member moves into an unlocked position distal from the shaft, the locking member in the unlocked position not prohibiting the shaft from moving into the brake-released position; and (g) moving, by means of a third act of the operator, the brake shaft into the brake-released position.

11. The method of claim 10, wherein the second act of the operator comprises closing a passenger-access door, and wherein the third act of the operator comprises pushing the knob forwardly of the vehicle body.

* * * * *